Patented May 7, 1935

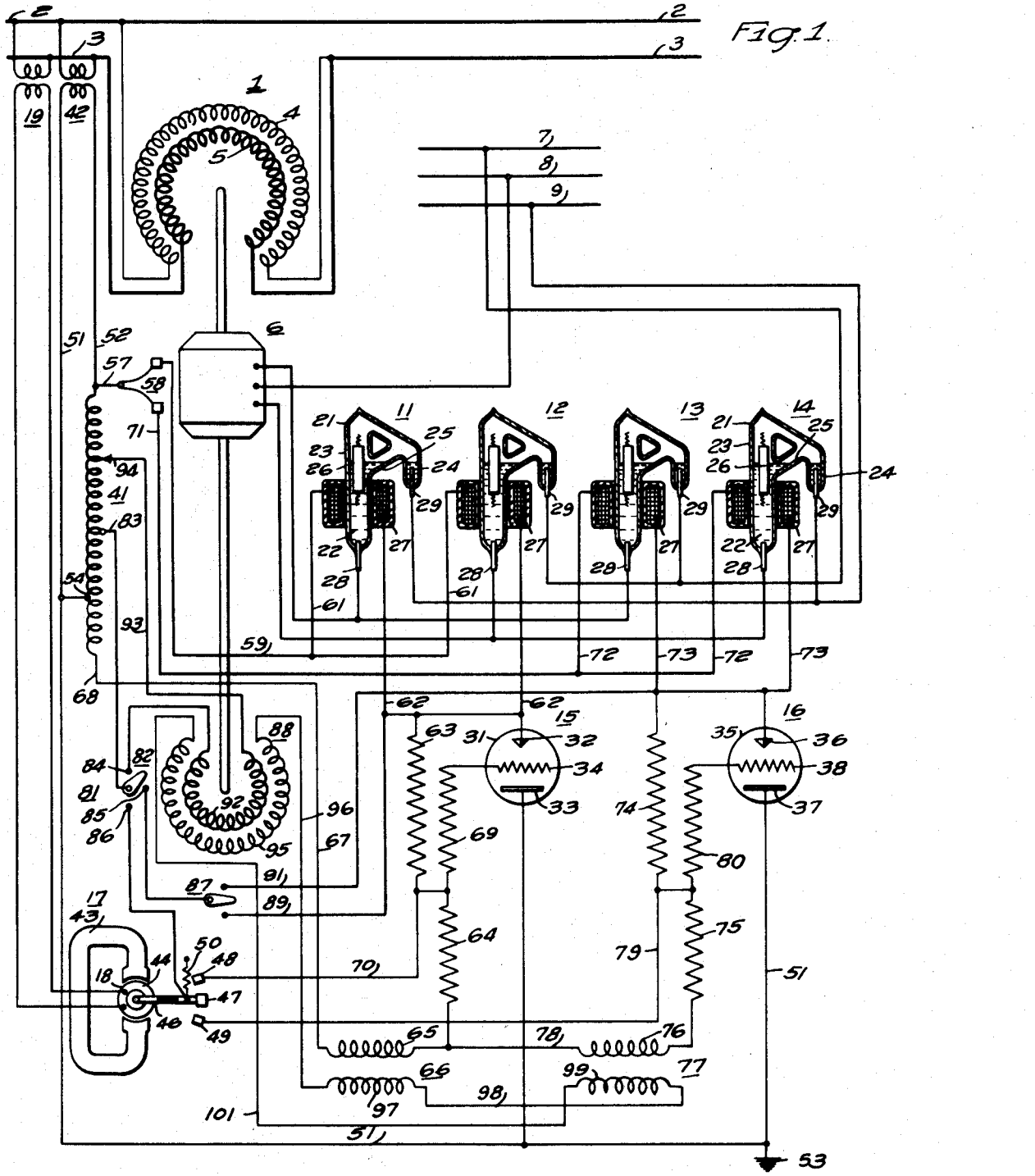

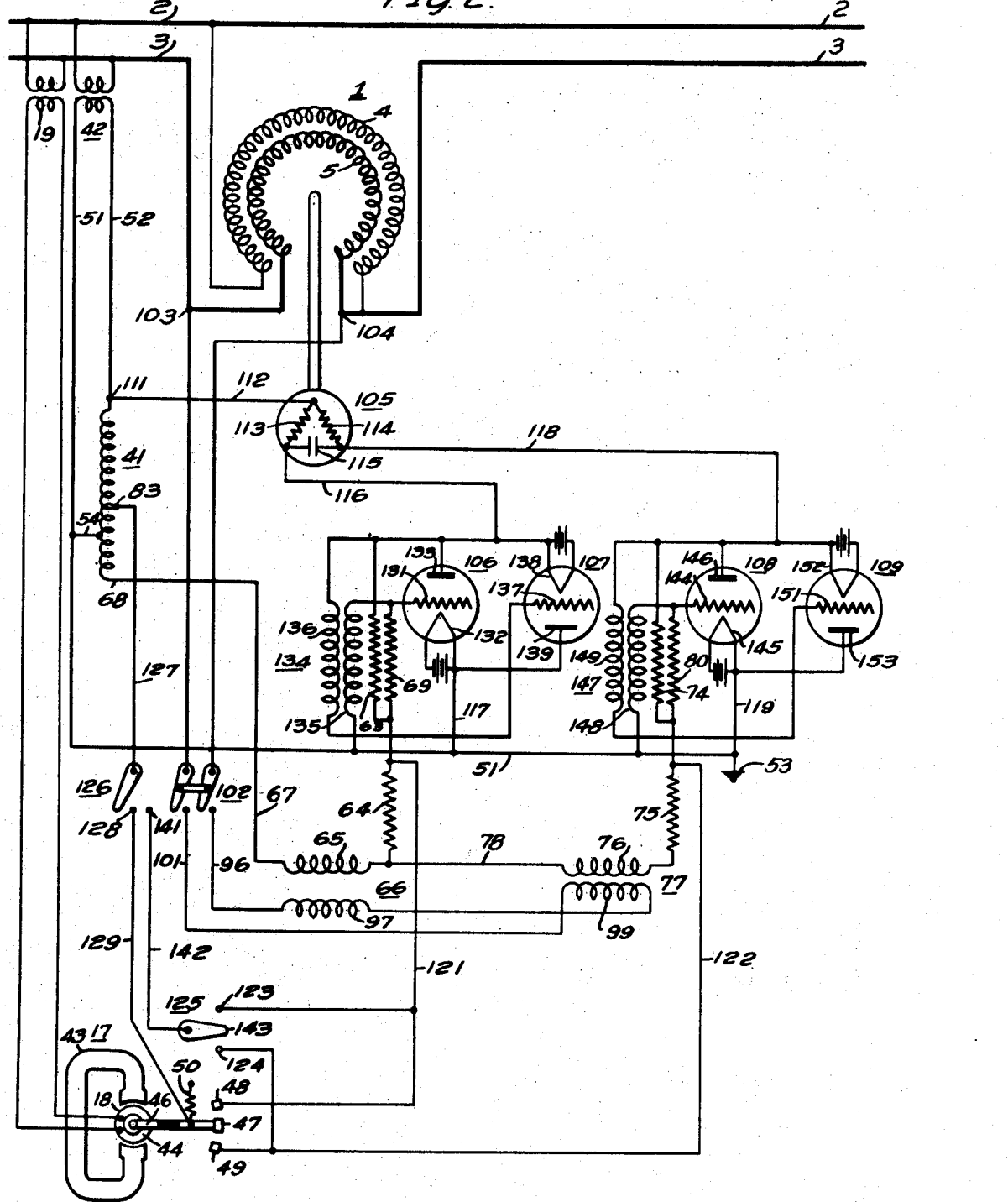

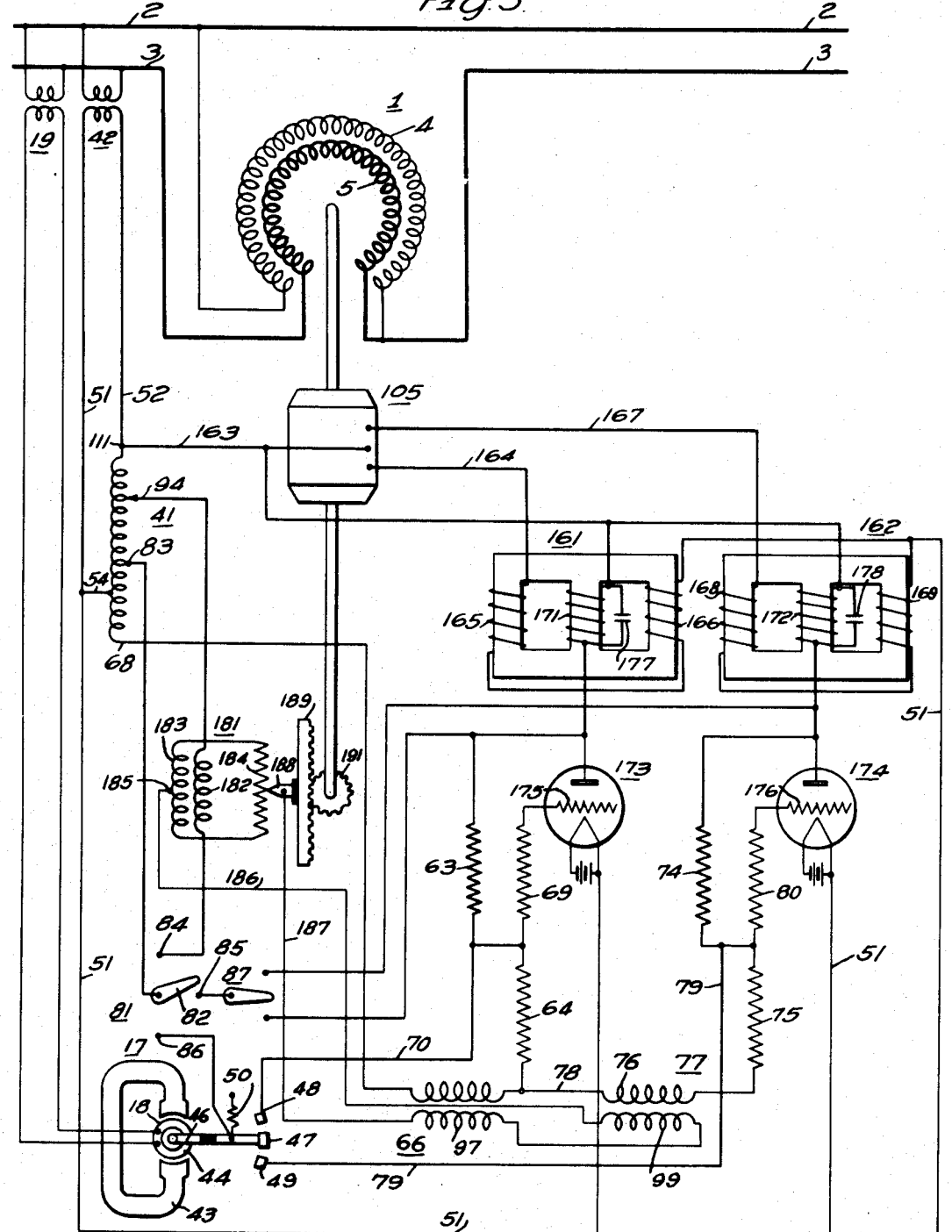

2,000,729

UNITED STATES PATENT OFFICE 2,000,729

ELECTRICAL CONTROL SYSTEM

Edward R. Wolfert, Wilkinsburg, Pa., assignor to Westinghouse Electric & Manufacturing Company, East Pittsburgh, Pa., a corporation of Pennsylvania Application June 29, 1933, Serial No. 678,221

3 Claims. (Cl. 171—119)

My invention relates to systems of electric motor control wherein directional motor control means are employed for controlling the operation of a motor associated with a motor-actuated device, such for example, as is used to regulate an electric characteristic, such as voltage, of an electrical circuit.

In regulating devices that are motor-operated throughout a predetermined range between established limits of travel for the purpose of regulating an electric characteristic, such as voltage of a circuit, it is often desirable to control the motor to automatically operate the regulating device to some predetermined neutral or normal position from any point intermediate its limits of travel. In induction voltage regulators, for example, that comprise a stationary member and a rotatable member, the relative positions of which effect an increase or decrease in the voltage of the circuit in which it is connected, it is desirable to operate the rotor of the regulator to its neutral position before disconnecting the regulator from the circuit. The position of the rotor of an induction regulator is usually controlled by a motor energized in accordance with the operation of a contact-making voltmeter that is energized in accordance with the voltage of the circuit that is being regulated. It is desirable, when taking such a regulator from service, to operate the rotor thereof to its midpoint. This may be done by providing manual means for controlling the regulator motor and the provision of a dial indicating when the rotor of the regulator is in its neutral position. It is often, however, inconvenient or undesirable to operate the motor in this manner.

It is an object of my invention to provide an improved system of control for an electric motor, normally controlled by means of tube relays to operate within a predetermined range in either direction from a predetermined point, in which said motor may be returned to said predetermined point from any position within its operating range at the will of the attendant.

It is a further object of my invention to provide a system of control for a motor-operated electric regulator normally actuated within a predetermined range on either side of a predetermined neutral point to operate toward and automatically stop at said predetermined neutral point.

My invention will be better understood from the following description taken in connection with the accompanying drawings, in which:

Figure 1 illustrates apparatus and circuits organized in accordance with one embodiment of my invention; and, Figs. 2 and 3 illustrate different modifications of the apparatus and circuits shown in Fig. 1.

Like reference characters indicate similar parts in the different views of the drawings. Referring to the drawings, and particularly to Fig. 1 thereof, an induction regulator 1 is illustrated connected for regulating the voltage of a circuit comprising circuit conductors 2 and 3, and comprising a primary or stator winding 4 that is connected between the circuit conductors, and a secondary or rotor winding 5 that is connected in series relation to the circuit conductor 3. A motor 6 is provided for changing the relative positions of the primary and secondary windings of the induction regulator and is illustrated as a three-phase alternating current motor arranged to be energized from the auxiliary supply conductors 7, 8 and 9.

The motor 6 is controlled in accordance with the operation of two groups of circuit controlling or directional motor switches 11 and 12, and 13 and 14, that are selectively energized by the operation of electric-discharge devices or grid-glow tubes 15 and 16 that are, in turn, controlled by a contact-making voltmeter 17 having an armature winding 18 connected to a voltage transformer 19 that is energized in accordance with the voltage between the circuit conductors 2 and 3.

The motor operating switches 11, 12, 13 and 14 are illustrated as being of the liquid type comprising a glass housing 21 containing a conducting liquid 22, such as mercury, and having parallel sections 23 and 24 connected together by a constricted section 25. A magnetizable member 26 that tends to float on the liquid 22 is placed in the elongated section 23 and acts as an armature member for the winding 27 that surrounds the lower portion of the section 23. Terminal members 28 and 29 extend through the lower walls of the sections 23 and 24, respectively and contact with the conducting liquid within the sections of the switch.

The windings 27 of the directional switches 11 and 12 are connected in parallel circuit relation and energized simultaneously to close a circuit for effecting the operation of the motor 6 in one direction. The windings 27 of the directional switches 13 and 14 are connected in parallel circuit relation and arranged to be simultaneously energized to close a circuit for effecting the operation of the motor 6 in the opposite direction.

The electric-discharge device 15 comprises an envelope 31 in which are positioned an anode 32, a cathode 33, and a grid element 34 substantially surrounding the anode. The envelope is filled with inert gas, such as argon or neon, under a pressure of approximately one hundredth of a millimeter of mercury. The electric-discharge device 16 is of similar construction comprising an envelope 35 having positioned therein an anode 36, a cathode 37 and a grid element 38.

For a given impressed voltage between the anode and the cathode of the tube 15, or of the tube 16, and for a given rarification of the gas within the tube, the gas will become ionized sufficiently to permit an appreciable current to pass through the space between the cathode and the anode, providing no force is present to oppose such current flow. When the grids 34 and 38 of the tubes 15 and 16, respectively, are connected as shown in the drawings, they will acquire a negative charge when alternating current is applied to the terminals of the tubes, which charge acts to oppose ionization of the gas within the envelope of the tubes. A much greater voltage is then required between the anode and cathode of a tube to ionize the gas in the space between them and permit current to flow through the tube.

The tubes 15 and 16 are of such design that for the voltage impressed across the terminals 32 and 33 of the tube 15, or the terminals 36 and 37 of the tube 16, from a transformer 42 that is energized from the conductors 3, and 4, current will not pass through the tubes when a negative charge exists on the grid, but will pass when the negative charge is removed.

The electric-discharge device 15 is connected in series circuit relation with the parallel connected windings 27 of the directional switches 11 and 12 to control the energization thereof by means of a circuit from potential transformer 42 which impresses an alternating potential between the cathode 33 and the anode 32 of the discharge device. Similarly, an alternating potential is impressed between the cathode 37 and the anode 36 of the electric-discharge device 16 by the potential transformer 42.

The contact-making voltmeter 17 comprises a permanent magnet 43 and an armature 44 having a winding 18 that is connected to the secondary winding of the transformer 19 and energized in accordance with the voltage between the circuit conductors 2 and 3. The armature 44 is provided with an arm 46 that carries, at its end, a contact member 47 which cooperates with two stationary contact members 48 and 49 to control the operation of the tubes 15 and 16. A biasing member, such as a spring 50, is provided for normally biasing the arm 46 in a direction to cause engagement of the contact members 47 and 48. The energization of the winding 18 causes the armature to be biased against the action of the spring 50.

The autotransformer 41 is connected to the secondary winding of the transformer 42 by means of conductors 51 and 52, the conductor 51 being connected at a point 54 remote from the lower terminal thereof. The conductor 51 is also connected to ground at 53 and to the cathodes 33 and 37 of the tubes 15 and 16, respectively. A circuit extends from one terminal of the autotransformer 41 through conductor 57, the upper of the two limit switches 58, conductor 59, and by branch conductors 61 through the windings 27 of the switches 11 and 12, and by branch conductors 62 to the anode 32 of the tube 15, through the tube, and from the cathode 33 thereof by the conductor 51 to the point 54 of the autotransformer 41.

From the point of union of the branch conductors 62 a circuit continues through resistors 63 and 64, one winding 65 of a grid transformer 66, and by conductor 67 to the lower terminal 68 of the autotransformer 41. The junction point between the resistors 63 and 64 is connected through a grid leak resistance 69 to the grid 34, and by conductor 70 to the contact member 48 of the voltmeter 17.

A similar circuit extends from the upper terminal of the auto-transformer 41 through conductor 57, the lower of the limit switches 58, through conductor 71, branch conductors 72 and windings 27 of the reversing switches 13 and 14 and branch conductors 73 to the anode 36 of the tube 16, through the tube 16, when in a current conducting condition, to the cathode 37, conductor 51, to the point 54 of the auto-transformer 41. From the anode 36 a circuit continues through the resistors 74 and 75, the winding 76 of the grid transformer 77, conductor 78, winding 65 of the transformer 66 and conductor 67 to the lower terminal 68 of the autotransformer 41. The junction point between the resistors 74 and 75 is connected through a grid leak resistor 80 to the grid 38 of the tube 16 and by a conductor 79 to the contact member 49 of the voltmeter 17.

A selector switch 81 is provided with a contact member 82 that is connected to the point 83 of the autotransformer 41 and is movable to selectively engage one of the contact members 84, 85 or 86 to select the desired manner of operating the induction regulator. When the switch blade 82 is in engagement with the contact member 84 the regulator will be controlled by the transmitter 88 to return to its mid or neutral position in a manner to be later described. When the switch blade is in engagement with the contact member 85 the regulator may be manually controlled by the switch 87, which is connected to close circuits through the conductor 89 and the windings 27 of the switches 11 and 12 to operate the motor 6 in one direction, or through the conductor 91 and the windings 27 of the switches 13 and 14 to operate the motor 6 in the other direction. When the switch blade 82 is in its lower position in engagement with the contact member 86 the movable contact member 47 of the contact-making voltmeter 17 is connected to the point 83 of the autotransformer 41, thus permitting automatic control of the regulator by the voltmeter 17.

If the voltage of the circuit 2—3 decreases with respect to its desired value the torque developed by the armature 44 of the voltmeter 17 will be insufficient to overcome the pull of the biasing member 50 and the armature will rotate sufficiently to cause engagement of the contact members 47 and 48, thereby providing a leakage path for the grid member 34 of the discharge device 15. The grid member 34 will then have a potential above that of the cathode 33 and the electric-discharge device 15 will become conductive and complete a circuit energizing the windings 27 of the directional switches 11 and 12 through the circuits previously traced. Operation of the switches 11 and 12 causes the motor 16 to be connected to the supply conductors 7, 8 and 9 to operate in a direction to increase the voltage of the supply circuit conductors 2—3. Should the voltage between the supply conductors 2—3 increase above its desired value, the contact member 47 will be actuated by the torque of the armature 44 against the force of the biasing member 50 and engage the contact member 49, thus increasing the potential of the grid member 38 above that of the cathode 37 and permitting current to flow through the tube 16, which current operates the switches 13 and 14 to close a circuit between the supply conductors 7, 8 and 9 and the motor 6 to operate the motor in a direction to decrease the voltage of the supply conductors 2—3.

Should, at any time, it become desirable to remove the regulator 1 from service, the contact member 82 of the switch 81 may be thrown to engage the contact member 84, thus completing a circuit from the point 83 of the autotransformer 41 through the switch 81, the primary winding 92 of the transmitter 88 and the conductor 93 to a tap point 94 of the auto-transformer 41, thus impressing a voltage on the primary winding 92. The winding 92 is inductively related to a secondary winding 95, the two windings being arranged in a manner similar to the windings of an induction regulator, the device 88 comprising in effect a miniature regulator, the winding 92 of which is actuated in accordance with the movement of the winding 5 of the regulator 1.

The positions of the windings 92 and 95 are such that when the regulator 1 is in its neutral or mid position, no voltage is induced between the windings 92 and 95, while if the regulator 1 is in any other than its neutral position, a voltage will be induced in the winding 95, the polarity of which depends upon whether the regulator 1 is in a buck or boost position, and the value of which depends upon the distance of the regulator rotor from its neutral position. This voltage decreases as the regulator approaches its neutral position and disappears at that position. The winding 95 is connected in a circuit comprising a conductor 96, the winding 97 of the grid transformer 66, conductor 98, the winding 99 of the grid transformer 77, and conductor 101 to the other terminal of the winding 95. The windings 97 and 99 are connected in opposite polarity, that is to produce opposite effects in the windings 65 and 76 respectively associated therewith. Accordingly, the grid of one of the tubes 15 or 16 is made positive while the other is made negative. The tube in which the grid is made positive will become conducting, thus causing the associated secondary relays 11 and 12, or 13 and 14, to close an effect operation of the motor 6 in the one or in the other direction toward neutral position of the regulator 1. As the regulator approaches its neutral position, the voltage induced in the winding 95 and, consequently, in the windings 97 and 99 will decrease, and the grid bias caused thereby upon the grids of the tubes 15 and 16 will decrease until at the neutral position the grid bias will disappear and the motor will stop.

Referring to Fig. 2, the induction regulator 1, the contact making voltmeter 17, the autotransformer 41, and their connections to the power circuit conductors 2 and 3 are the same as in the system illustrated in Fig. 1. When the control system is employed to govern the induction regulator the small induction device or transmitter 88 of Fig. 1 may be omitted, as illustrated, in the system of Fig. 2 and the circuit represented by the conductors 101 and 96, and including the primary windings 97 and 99, respectively, of the grid transformers 66 and 77, may be connected, through the switch 102, between the points 103 and 104 which are the terminal points of the series winding 5 of the induction regulator 1.

The system illustrated in Fig. 2 also differs from that illustrated in Fig. 1, in that the secondary relays, or motor control mercury switches, are omitted and a single phase capacitor motor 105 is employed to operate the regulator 1 and is controlled by hot cathode vacuum tubes 106, 107, 108 and 109, the control grids of which are biased in a manner similar to that of the grids shown in the system of Fig. 1. The vacuum tubes of Fig. 2 differ from the gas filled or grid glow tubes illustrated in Fig. 1, in that in the gas filled tubes, the current is either flowing at its full value or is completely cut off, while in the vacuum tube the current varies in a manner depending upon the magnitude of the grid voltage, the current increasing with increasing positive bias up to a relatively high value.

The connections of the secondary windings 65 and 76 of the grid control transformers 66 and 77, respectively, to the lower terminal 68 of the auto-transformer 41 and the connections of the resistors 64, 63 and 69 with respect to the power transformer 41 and to the anode and grid of the tube 106, and the resistors 75, 74 and 78 with respect to the transformer 41 and to the anode and grid of the tube 108, correspond to the connections between the same elements shown in Fig. 1, the tubes 15 and 16 of Fig. 1 corresponding to the tubes 106 and 108 of Fig. 2. The connections between the contact members 48 and 49 of the contact making voltmeter 17 and the tube control grids are the same as in the system of Fig. 1. Since a tube passes current only during alternate one-half cycles, two tubes 106 and 107, and 108 and 109, are respectively connected to provide for both directions of current flow in each of the two motor operating circuits.

The motor control circuit for operating the motor 105 in a direction to increase or boost the voltage in the circuit of the conductors 2—3 extends from the upper terminal 111 of the auto-transformer 41, by conductor 112, through the motor winding 113 that is connected in parallel circuit relation with a current path extending through the motor winding 114 and the condenser 115 in series, by conductor 116, tubes 106 and 107, conductor 117, and a conductor 51 to the point 54 on the auto-transformer 41. The motor control circuit for operating the motor in a direction to buck or decrease the voltage of the conductors 2—3 is from the terminal 111 of the auto-transformer 41 by conductor 112, the motor winding 114 which is in parallel circuit relation to a current path through the motor winding 113 and the condenser 115, by conductor 118, tubes 108 and 109 and conductors 119 and 51 to the point 54 on the auto transformer 41.

To operate the motor 105 in the one or in the other direction, one of the grid control conductors 121 or 122 is connected to the point 83 on the auto-transformer 41 through the associated contact member 123 or 124 of the manually operable switch 125, or the associated contact member 48 or 49 of the contact making voltmeter 17, and through the switch 126 in its appropriate circuit closing position.

For example, if it is desired to control the motor 105 by the contact making voltmeter 17, the switch 126 is closed to connect the point 83 through conductor 127, the switch contact member 128 and conductor 129 to the movable contact member 47 of the contact making voltmeter 17. If now the voltage of the circuit 2—3 drops below its desired value, the contact member 47 engages the contact member 48, thus connecting the grid control conductor 121 and the grid 131 of the tube 106 to the point 83 of the auto-transformer 41 by the circuit just described. During the one-half cycle in which the terminal 111 is positive with respect to the point 54, this grid control circuit provides a positive bias on the grid 131 with respect to the cathode 132 and permits current to flow through the tube 106 from the plate 133 to the filament or cathode 132.

An auxiliary grid transformer 134, having a primary winding 135 connected between the grid 131 and the conductor 51 and to the point 54 of the auto-transformer, and having a second winding 136 connected between the anode 133 of the tube 106 and the grid 137 of the tube 107, acts to produce a bias on the grid 137 with respect to the point 111 of a similar amount but of opposite phase displacement to the bias on the filament 131 with respect to the point 54 on the auto-transformer 41, thus permitting current to flow through the tube 107 from the plate 139 to the cathode 138 during the one-half cycle in which the point 54 is positive with respect to the point 111. When current flows through the tubes 106 and 107 and the winding 113 of the motor 105, as above traced, the motor is operated in a direction to cause the induction regulator 1 to boost the voltage on the circuit 2—3.

If the voltage on the conductors 2—3 increases above its desired value, the contact member 47 will be biased downwardly against the action of the spring 50, causing engagement of the contact members 47 and 49 and connecting the grid 144 of the tube 108 through the conductor 122 to the point 83 of the auto-transformer, as above described. The auxiliary grid control transformer 147, comprising a primary winding 148 connected between the grid 144 and the conductor 51 and a secondary winding 149 connected between the plate 146 of the tube 108 and the grid 151 of the tube 109, functions in the same manner with respect to the tubes 108 and 109, as does the grid transformer 134 with respect to the tubes 106 and 107, thus permitting current to flow between the plate 146 and the cathode 145 of the tube 108 during alternate half cycles of the alternating voltage wave and between the plate 153 and the cathode 152 of the tube 109 during the remaining half cycles of the alternating voltage wave, thus completing a circuit through the winding 114 of the motor 105, causing it to operate in a direction to decrease the voltage on the circuit comprising conductors 2—3.

The same operation of the motor may be effected manually, if desired, by operating the switch 126 to connect the point 83 of the auto-transformer with the contact member 141, and by conductor 142 to the moving contact member 143 of the manually operated switch 125, and by operating the switch to cause engagement of the contact member 143 with the contact member 123 or the contact member 124.

Referring to Fig. 3, the motor 105 is a single phase capacitor motor similar to that illustrated in Fig. 2 and is controlled by the saturating core reactors 161 and 162. One of the motor windings is connected in a circuit extending from the terminal 111 of the auto-transformer 41, by conductor 163, through the motor winding, by conductor 164 and windings 165 and 166 of the reactor 161 to conductor 51 and to the point 54 on the auto-transformer 41. The other motor winding is connected by a circuit that extends from the terminal 111 of the auto-transformer 41 by conductor 163, through the other motor winding, by conductor 167, windings 168 and 169 of the reactor 162, and conductor 51 to point 54 on the auto-transformer 41.

The reactors 161 and 162 have sufficiently high reactance to prevent the flow of appreciable current therethrough unless saturated by direct current. These reactors are provided with saturating windings 171 and 172, respectively, connected in series with tubes 173 and 174, which, when conducting, saturate the respective cores of the reactors and permit the flow of alternating current through the motor circuits. The tubes 173 and 174 are connected in circuit in the same way as are the tubes 106 and 108, respectively, of the system shown in Fig. 2, the coils 171 and 172 of the reactors being substituted for the coils 113 and 114, respectively of the motor 105, and the grids 175 and 176 of the two tubes are connected to be controlled by the contact making voltmeter 17 in a manner similar to the grids 131 and 144 of the tubes 106 and 108 of Fig. 2.

However, only one tube for each motor circuit is used in the system of Fig. 3, which passes current during each alternate half cycle of the alternating current wave. Condensers 177 and 178 are connected in parallel, respectively, with the saturating windings 171 and 172 of the reactors to smooth out the impulses in the unidirectional current therethrough. The manually controlled switch 87 and the selector switch 81 are connected to the auto transformer in the same manner as in the system illustrated in Fig. 1.

In the embodiment of the invention illustrated in Fig. 3, the neutral return device comprises a potentiometer 181 having a transformer including a primary winding 182 that is connected between the points 83 and 94 of the auto transformer 41 when the switch 81 is closed in its upper position. The transformer comprises also a secondary winding 183, the terminals of which are connected to the terminals of a resistor 184 and the midpoint 185 of which is connected by the conductor 186, the primary windings 99 and 97, respectively, of the grid controlled transformers 77 and 66 and by conductor 187 to a moving contact member 188 and to a point on the resistor 184 depending upon the position of the contact 188. When the induction regulator is in its mid position, the contact member 188 will also be at its mid or illustrated position and no voltage is impressed across the primary windings 97 and 99 of the grid control transformers. As the induction regulator moves from its mid position, in the one or in the other direction, the contact member 188 is correspondingly moved by the rack 189 and pinion 191 geared to the motor 105, thus providing for impressing a voltage of increasing value across the circuit including the primary windings 97 and 99 when the switch 81 is again closed in its upper position to energize the winding 182. The magnitude of this voltage will be greater the greater the distance of the contact member 188 from its mid position and the phase relation of this voltage will depend upon the direction of movement of the contact member 188 from its mid position and will be in such relation as to cause a positive bias upon the grid of the tube 173 or 174 required to control the operation of the motor 105 to operate it in a direction toward its neutral or mid position. As this position is approached, the voltage between the point 185 and the contact member 188 will decrease, and disappear at the neutral position, thus causing the motor to stop.

Since many modifications may be made in the apparatus and circuits illustrated, without departing from the spirit of my invention, I do not wish to be limited otherwise than by the scope of the appended claims.

I claim as my invention:

1. In a system comprising an electrical circuit, a regulator having a movable member for adjusting a characteristic of said circuit, a motor adapted to actuate said member to any point within predetermined limits of travel, forward and reverse energizing circuits for said motor, a grid-controlled electronic tube adapted to control each of said circuits, means for supplying grid potentials to said two tubes, and means responsive to said circuit characteristic for adjusting said potentials, the combination of selective means for oppositely varying said tube grid potentials in accordance with the departure of said movable member from a predetermined intermediate or neutral position to thereby cause the motor to return said member to said neutral position.

2. In a system comprising an electrical circuit, a regulator having a movable member for adjusting a characteristic of said circuit, a motor adapted to actuate said member to any point within predetermined limits of travel, forward and reverse energizing circuits for said motor, a grid-controlled electronic tube adapted to control each of said circuits, means for supplying grid potentials to said two tubes, and means responsive to said circuit characteristic for adjusting said potentials, the combination of selective means, comprising a pair of inductively related windings the relative positions of which are determined by the position of the movable member of the regulator, for oppositely varying said tube grid potentials in accordance with the departure of said member from a given intermediate or neutral position to thereby cause the motor to return said member to said neutral position.

3. In a regulating system comprising an electrical circuit, a regulator having a movable member for adjusting a characteristic of said circuit, a motor for actuating said member to any point within predetermined limits of travel, forward and reverse energizing circuits for said motor, a grid-controlled electronic-tube adapted to control each of said circuits, means for supplying grid-potentials to said two tubes, and means responsive to said circuit characteristic adapted to so vary said potentials as to render the tubes selectively conductive, the combination of neutral-position-return means adapted to oppositely vary said tube grid potentials in accordance with the departure of said movable member from a predetermined intermediate or neutral position, and means for transferring the control of said grid-potential supply means from said circuit-characteristic responsive means to said neutral-position-return means.

EDWARD R. WOLFERT.